United States Patent
Duan et al.

(10) Patent No.: US 7,404,235 B2
(45) Date of Patent: *Jul. 29, 2008

(54) HINGE ASSEMBLY FOR PORTABLE ELECTRONIC DEVICES

(75) Inventors: Chao Duan, Shenzhen (CN); Mao-Fa Jiang, Shenzhen (CN); Chia-Hua Chen, Tu-Cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 277 days.

This patent is subject to a terminal disclaimer.

(21) Appl. No.: 11/261,244

(22) Filed: Oct. 28, 2005

(65) Prior Publication Data

US 2006/0147035 A1    Jul. 6, 2006

(30) Foreign Application Priority Data

Dec. 30, 2004    (CN) .................. 2004 1 0091953

(51) Int. Cl.
  *E05D 11/10*    (2006.01)
(52) U.S. Cl. .......................... 16/330; 16/303
(58) Field of Classification Search ............ 16/303, 16/330; 361/680–683, 814; 455/575.1, 575.3, 455/575.4, 575.8, 550.1, 90.3; 379/433.12, 379/433.13; 348/373, 794, 333.06
See application file for complete search history.

(56) References Cited

U.S. PATENT DOCUMENTS

| | | | | |
|---|---|---|---|---|
| 6,115,886 A | * | 9/2000 | Fujita | 16/330 |
| 6,766,180 B2 | * | 7/2004 | Doraiswamy et al. | 455/575.1 |
| 2004/0202314 A1 | * | 10/2004 | Lu et al. | 379/433.01 |
| 2005/0138771 A1 | * | 6/2005 | Su | 16/330 |
| 2005/0220294 A1 | * | 10/2005 | Gupte | 379/433.13 |

FOREIGN PATENT DOCUMENTS

JP    2004108453 A   *   4/2004

* cited by examiner

*Primary Examiner*—Chuck Y. Mah

(57) ABSTRACT

A hinge assembly (200) for joining a cover section (110) to a body section (120) of a foldable electronic device (100) includes a main shaft (10), a rotating member (20), a sliding member (30), and a spring (40). The main shaft has a fixing portion (12) at one end, a deformed shaft portion (14) at its central section, and a distal shaft portion (16) at the other end. The rotating member receives the distal shaft portion, and the rotating member includes an engaging portion (24). The sliding member engages with the deformed shaft portion. The sliding member has a deformed hole (34), engaging with the engaging portion of the rotating member. The spring surrounds the main shaft and elastically biases between the sliding member and the fixing portion. The hinge assembly is modularized, easy to install, and low in cost.

14 Claims, 6 Drawing Sheets

HINGE ASSEMBLY FOR PORTABLE ELECTRONIC DEVICES

BACKGROUND OF THE INVENTION

1. Field of the Invention

The present invention relates to hinge assemblies and, particularly, to a hinge assembly for foldable electronic devices such as portable telephones, portable computers, PDA (Portable Digital Assistant) and so on.

2. Discussion of the Related Art

At present, perhaps the most popular portable electronic device in the marketplace is the foldable cellular telephone, which generally includes a cover section and a body section. The cover section and the body section are rotatably interconnected through a hinge assembly, for switching the telephone between an in-use position and a closed position.

One kind of hinge assembly employs a compression coil spring and a cam to make the cover section open up from the body section and be held in an open position. An example of such a kind of hinge assembly is represented in FIG. 8 (Prior Art). That hinge assembly is used in a foldable mobile phone 70. The foldable mobile phone 70 includes a main housing 72 and a cover 74. The hinge assembly includes two cams 60, 62, a spring 64, and a pair of posts 76 contained in the main housing 72. The cover 74 has a channel 742 defined at an end thereof. The cam 62, the spring 64, and the cam 60 are fixed in the channel 742, in that order. The cams 60, 62 protrude out from the channel 742 and engage with the posts 76. When the cover 74 is rotated, the cams 60, 62 rotate along with the cover 74, until stopping the cover 74 in a position where it maintains an angle of 180° relative to the main housing 72.

However, the hinge assembly includes a variety of individual pieces that must be installed within the foldable mobile phone when the foldable mobile phone is assembled. This does not meet the growing trend for foldable mobile phone manufacturers to use integrated one-piece hinge assemblies that can be quickly and easily press-fitted into foldable mobile phone sub-assemblies during manufacturing. Manufacturing costs associated with non-integrated hinge assemblies are higher than those associated with one-piece hinge assemblies.

Accordingly, what is needed is a hinge assembly for devices such as mobile phones, in which the hinge assembly modularized, easy to be installed into foldable mobile phones, and low in cost.

SUMMARY OF THE INVENTION

One embodiment of the present hinge assembly includes a main shaft, a rotating member, a sliding member, and a spring. The main shaft has a fixing portion at one end, a deformed shaft portion at its central section, and a distal shaft portion at the other end. The rotating member receives the distal shaft portion of the main shaft, and the rotating member includes an engaging portion. The sliding member operatively mates with the deformed shaft of the main shaft. The sliding member has a deformed hole, matingly engaging with the engaging portion of the rotating member. The spring surrounds the main shaft and elastically biases against the sliding member and the fixing portion of the main shaft.

Other objects, advantages and novel features of the present hinge assembly will become more apparent from the following detailed description when taken in conjunction with the accompanying drawings.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views.

DETAILED DESCRIPTION OF THE INVENTION

Figure 1:
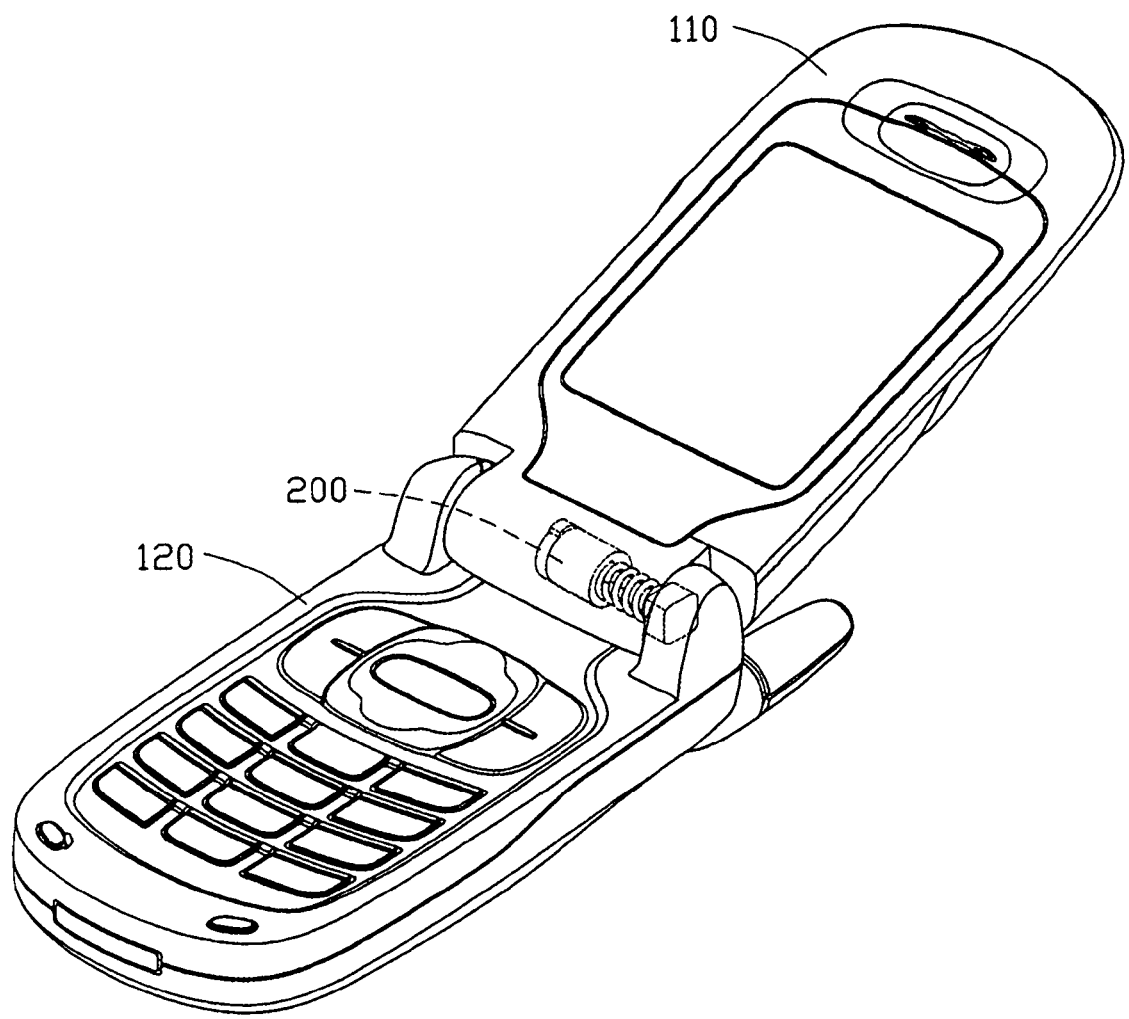
FIG. 1 is an isometric view of an embodiment of the present hinge assembly, as used in a mobile phone.

Referring now to the drawings in detail, FIG. 1 shows that a hinge assembly 200, applied to a portable electronic device 100 such as a flip type mobile phone, for pivotably coupling a cover section 110 and a body section 120 together. It is to be understood, however, that the hinge assembly 200 could be advantageously used in other environments (e.g., cabinet doors). As such, although proving particularly advantageous when used in foldable electronic devices, the hinge assembly 200 should not be considered limited in scope solely to an intended use environment of foldable electronic devices.

Figure 2:
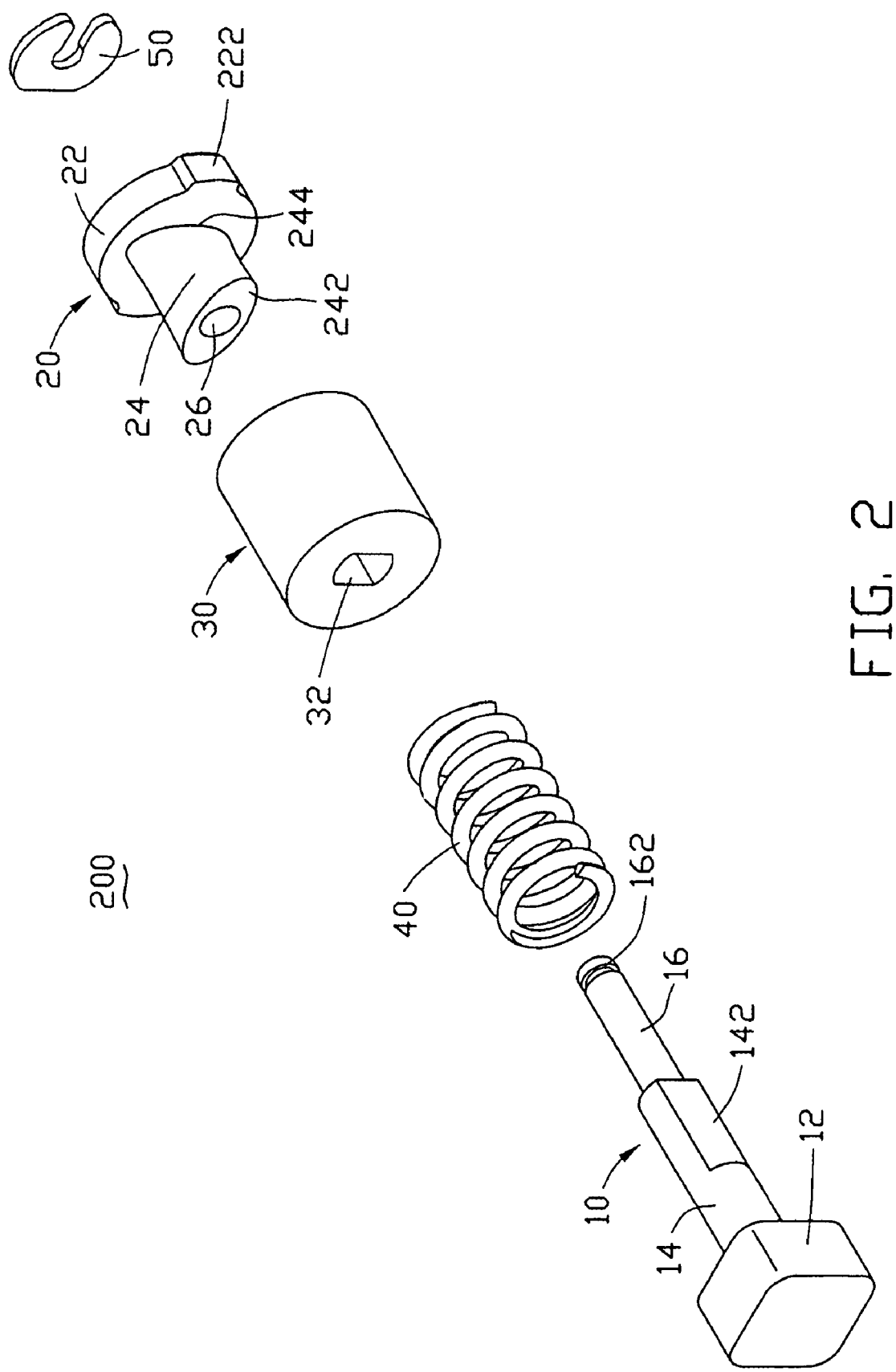
FIG. 2 is an exploded, isometric view of the embodiment of the hinge assembly shown in FIG. 1.
Figure 3:
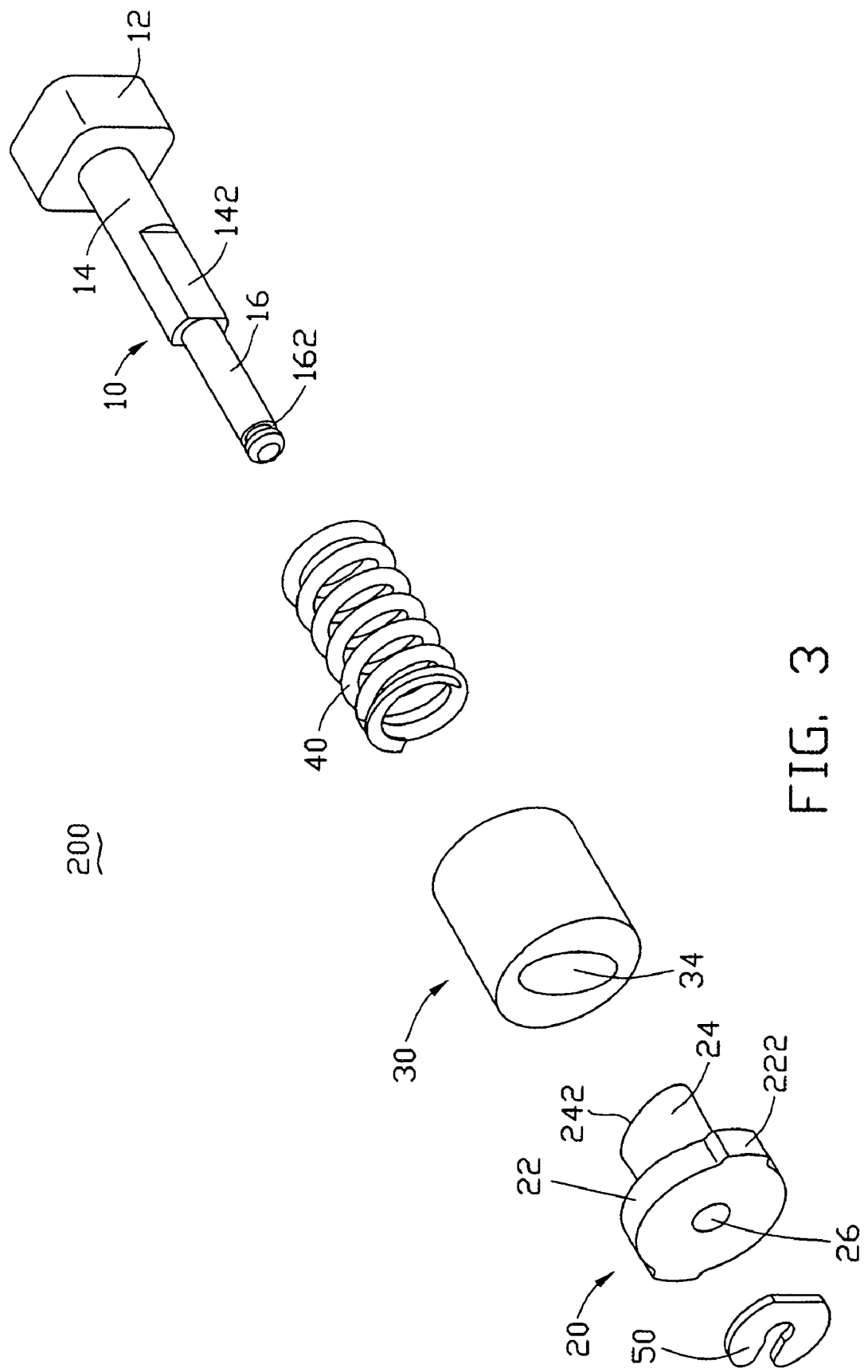
FIG. 3 is similar to FIG. 2, but viewed from another aspect.

Referring to FIGS. 2 and 3, the hinge assembly 200 includes a main shaft 10, a rotating member 20, a sliding member 30, a spring 40, and a locking member 50. The spring 40, the sliding member 30, and the rotating member 20 are placed, in that order, to surround the main shaft 10. The locking member 50 is locked at one end of the main shaft 10, adjacent the rotating member 20. Accordingly, all of the elements are installed together.

The main shaft 10 includes a fixing portion 12, a flat-sided shaft portion 14 (e.g. having two-flat sides in the illustrated embodiment) and a distal shaft portion 16, either connecting or integral with each other. The fixing portion 12 is substantially a cuboid (i.e., a rectangular parallelepiped, likely (although not necessarily) having a pair of opposing square faces), formed at an end of the flat-sided shaft portion 14. The fixing portion 12 is configured for engaging with the body section 120. The flat-sided shaft portion 14 is formed/positioned at an intermediate location between the fixing portion 12 and the distal shaft portion 16. The flat-sided shaft portion 14 has two opposed flat surfaces 142 defined thereon. The distal shaft portion 16 is formed at an opposite end of the flat-sided portion 14 and has a loop groove 162 defined at a distal end thereof.

Figure 4:
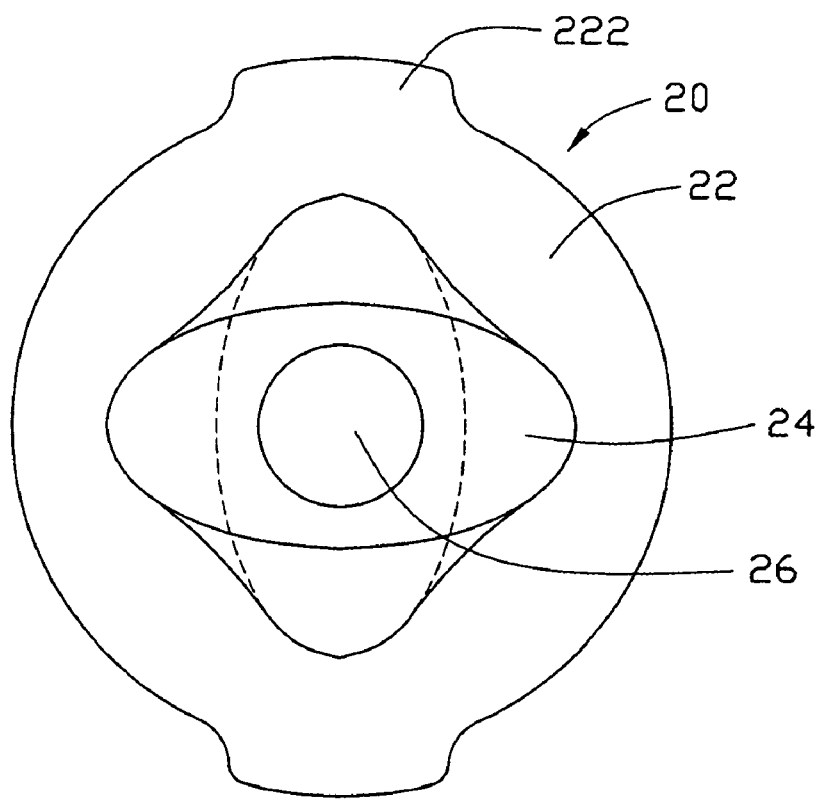
FIG. 4 is a side sectional view of a rotational member of the hinge assembly in FIG. 2.

Also referring to FIG. 4, the rotating member 20 includes a latching portion 22 and an engaging portion 24 connected with the latching portion 22. The latching portion 22 is substantially a cylinder or disk. Two symmetrically opposite protrusions 222 are formed at (i.e., on) a peripheral wall of the latching portion 22, each protrusion 222 being configured for engaging with the cover section 110 in a manner that allows the given protrusion 222 to only slide relative to the cover section 110. While two such protrusions 222 are shown, it is to be understood any number of protrusions 222 could be employed and still be within the scope of the hinge assembly 200. The engaging portion 24 is substantially a twisted/torsional cylinder, as can be seen from FIGS. 2 and 4-7, with two opposite end surfaces 242, 244. The two opposite end surfaces 242 and 244 are the congruent, parallel ellipses, each perpendicular to an axis of the rotating member 20 (i.e., the opposite end surfaces 242 and 244 are "twisted" 90° relative to one another). A long axis of the end surface 242 is parallel with a short axis of the opposite end surface 244. A smooth exterior twisted surface is formed between the two end surfaces 242, 244. The rotating member 20 has a circular through hole 26 defined therein. The circular through hole 26 receives therein the distal shaft portion 16 of the main shaft 10, thereby allowing the rotating member 20 to rotate relative to the main shaft 10.

Figure 5:
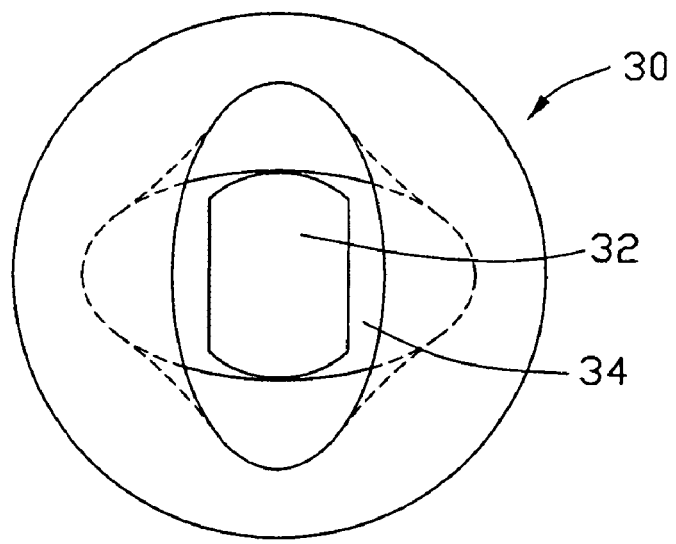
FIG. 5 is a side sectional view of a sliding member of the hinge assembly in FIG. 2.

Also referring to FIG. 5, the sliding member 30 is substantially a cylinder, with an engaging hole 32 and a elliptical hole 34. The engaging hole 32 and the elliptical hole 34 are respectively defined in two sides of the sliding member 30 and are in communication with each other. The engaging hole 32 has two opposing arcuate faces and two opposing flat faces (faces not labeled). As such, the engaging hole 32 is configured for engagingly receiving the flat-sided shaft portion 14 of the main shaft 10, so as to only slide relative to the flat-sided portion 14. The elliptical hole 34 is generally elliptical, similar to the end face 242 of the engaging portion 24, and is thus configured for engaging with the engaging portion 24 of the rotating member 20.

The spring 40 is substantially a cylinder (i.e., occupying a cylindrical volume). The spring 40 is placed around to the main shaft 10, with one end of the spring 40 resisting/biasing the sliding member 30, the opposite end of the spring 40 resisting the fixing portion 12 of the main shaft 10. In this manner, the spring 40 is effectively configured for promoting/maintaining the operative contact (i.e., engagement) between the sliding member 30 and the rotating member 20 by effectively elastically biasing such members 20, 30 toward one another. Such contact between members 20, 30 could instead potentially be promoted, e.g., by relocating (embodiment not shown) the spring 40 to a location between the rotating member 20 and the locking member 50 or by adding an additional spring (not shown) between the members 20, 50. The spring force applied to the members 20, 30 should be sufficient to ensure contact therebetween but should not be so large as to prevent slidable movement relative to one another.

The locking member 50 has a substantially C configuration. The locking member 50 locks in the groove 16 of the main shaft 10 so as to thereby prevent the sliding member 30 and rotating member 20 from coming off the main shaft 10 during operation.

Figure 6:
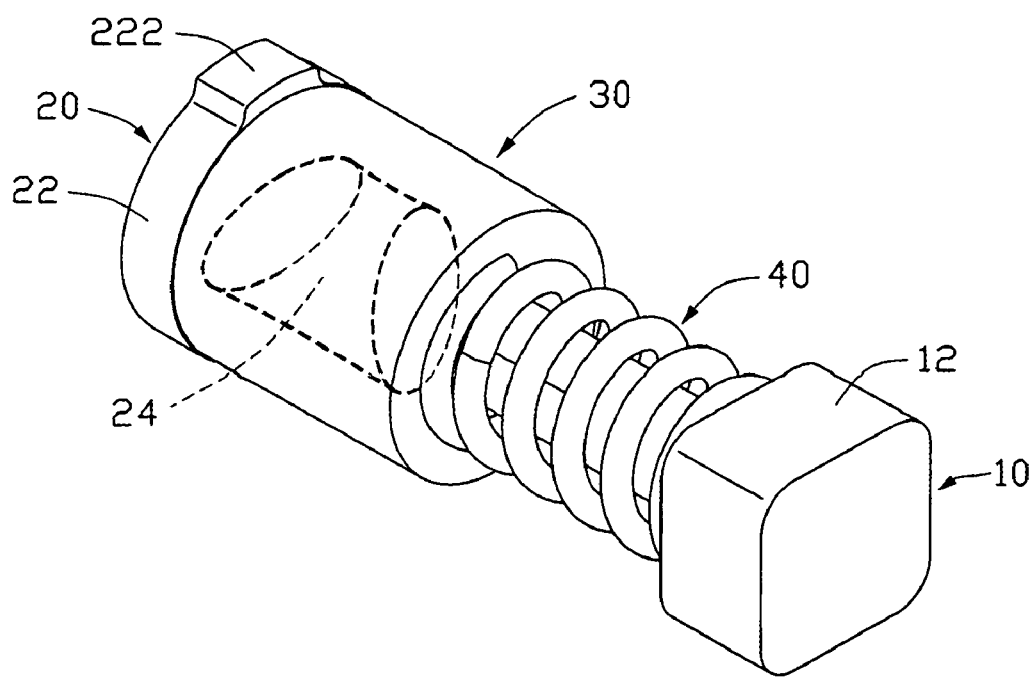
FIG. 6 is an isometric view showing the hinge assembly in a position corresponding to an open state of the mobile phone.
Figure 7:
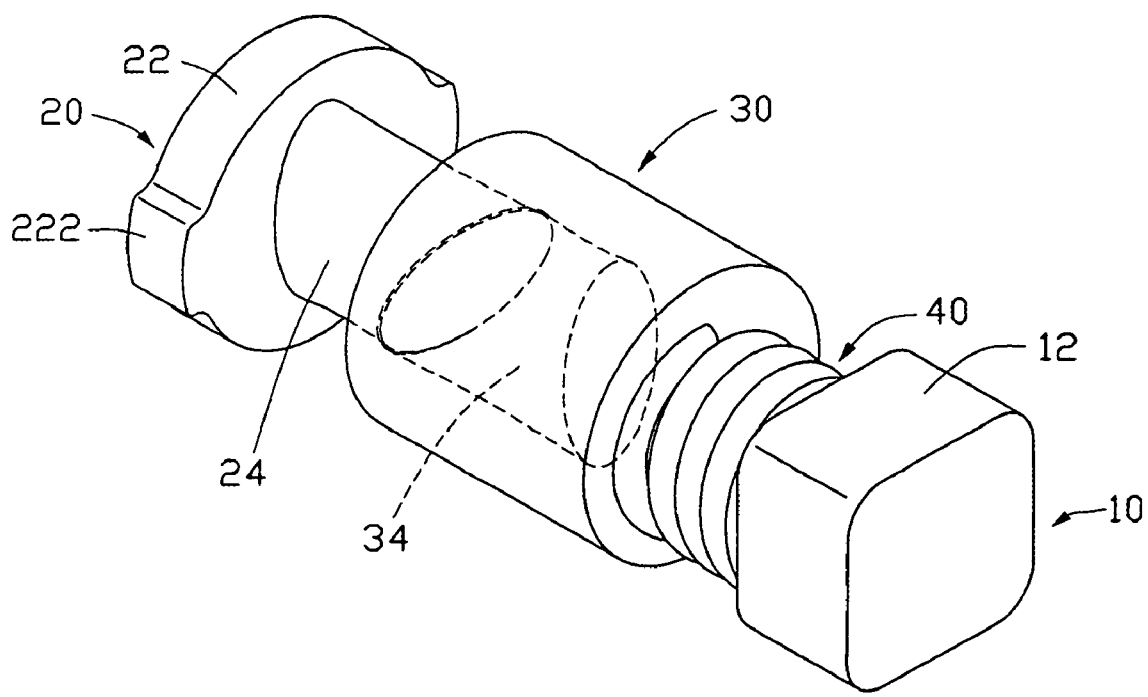
FIG. 7 is similar to FIG. 6, but showing the hinge assembly in a position corresponding to a closed state of the mobile phone.
Figure 8:
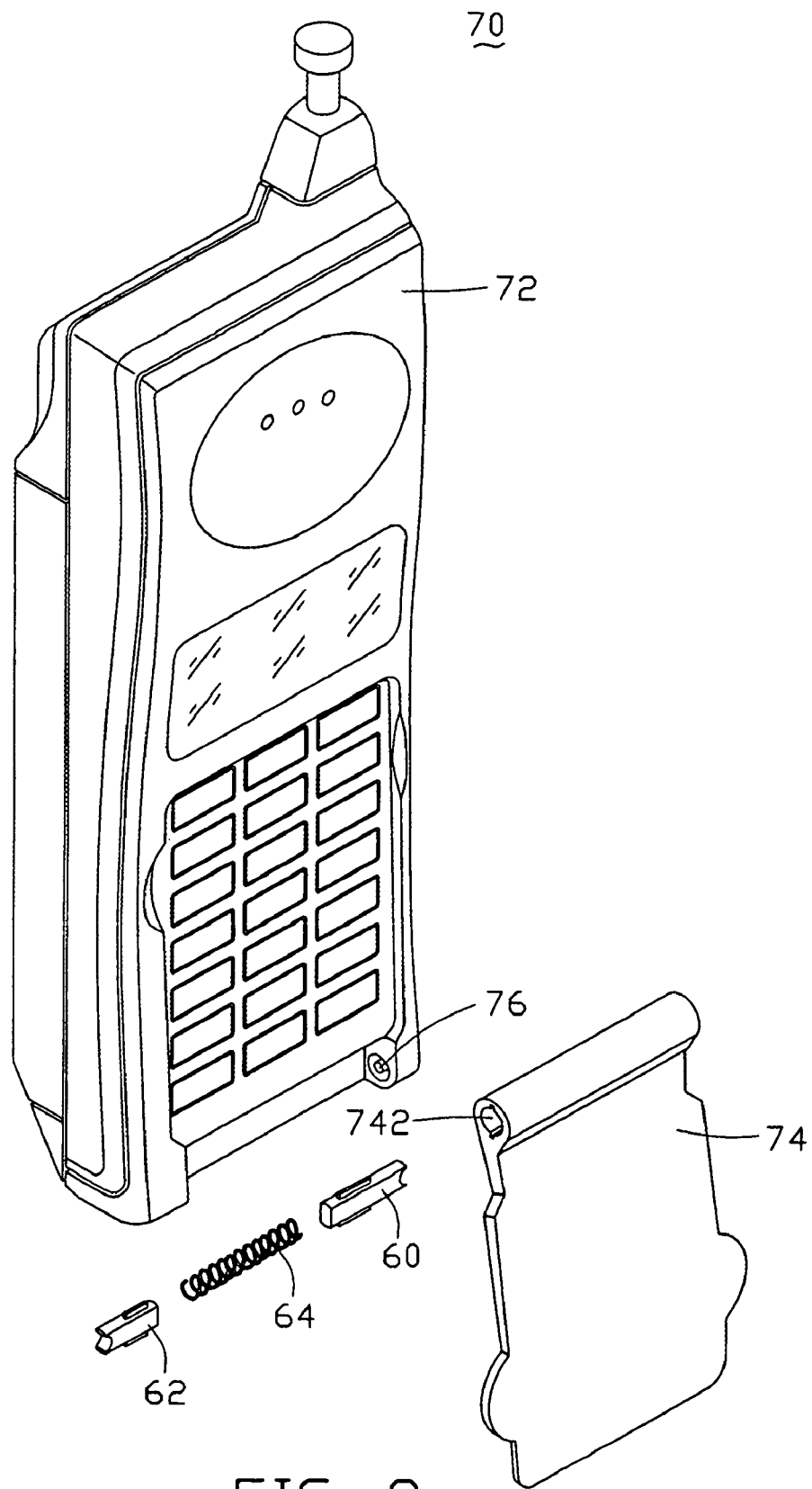
FIG. 8 is an exploded, isometric view of a conventional hinge assembly.

In assembly, referring to FIGS. 6 and 7, the distal shaft portion 16 of the main shaft 10 is inserted through the spring 40, the sliding member 30, and the rotating member 20. The locking member 50 is locked into the loop groove 162 of the main shaft 10. Once the individual hinge components are assembled as described above, the hinge assembly 200 provides a self-contained component that can be sold as an off-the-shelf component or directly incorporated into a mobile phone or other device during manufacture. If incorporated into the mobile phone during manufacture, the protrusions 222 engage in a cavity (not shown) of the cover section 110 of the mobile phone 100, and the fixing portion 12 of the main shaft 10 engages in the body section 120 of the mobile phone 100. When the cover section 110 of the mobile phone 100 is in a fully closed position, the engaging portion 24 is totally received in the deformed hole 34 of the sliding member 30, and the hinge assembly 200 is in a steady state.

In use, when the cover section 110 of the mobile phone 100 is moved from the closed position to the open position by force, the cover section 110 causes the rotating member 20 to rotate relative to the body section 120. The rotating member 20 further forces the sliding member 30 to rotate. However, the sliding member 30 is limited in its movement by the interconnection of the engaging hole 32 thereof with the flat-sided shaft 14 of the main shaft 10. Thus, the sliding member 30 can only slide relative to the flat-sided shaft 14 of the main shaft 10. Accordingly, when the rotating member 20 rotates, the sliding member 30 slides towards to the spring 40. The spring 40 is thereby compressed. Once the rotating member 20 rotates 90 degrees, the hinge assembly 200 is at a critical state. The sliding member 30 passes over the critical state when a continued force is applied. Then, alter the force is stopped, the sliding member 30 adversely slides relative to the rotating member 20 due to the force of the spring 40. The sliding member 30 pushes the rotating member 20, inducing the rotation of the rotating member 20 until the sliding member 30 is at its next steady state. The cover section 110 is thus opened automatically to a fully open position under the decompression force of the spring 40. Accordingly, the cover section 110 is moved 180 degrees relative to the body section 120. Preferably, the structure of the cover section 110 and the body section 120 are adapted to control the degree of rotation of the hinge assembly 200, such that the sliding member 30 can be held in one or more particular locations between the engaging portion 24 and the elliptical hole 34.

When the cover section 110 of the mobile phone 100 is closed, the cover section 110 causes the rotating member 20 to rotate relative to the body section 120. The sliding member 30 slides along the flat-sided shaft portion 14. After the rotating member 20 rotates to the critical position, the sliding member 20 continues to rotate under the role of the spring 40 and the elliptical hole 34 of the sliding member 30 until the sliding member 30 tightly abuts the rotating member 20 at a stable state. Accordingly, the cover section 110 becomes closed relative to the body section 120.

As described above, the present invention provides a hinge assembly 200 for use with any various portable devices, beyond the mobile phone illustrated, and/or with other devices needing a hinge assembly that selectably facilitates the achievement of fully open and fully closed positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:
1. A hinge assembly, comprising:
a main shaft having a fixing portion at one end thereof, a flat-sided shaft portion at a central section thereof, and a distal shaft portion at the other end thereof;
a rotating member being rotatably placed around the distal shaft portion of the main shaft, the rotating member including an engaging portion;
a sliding member engaging with the flat-sided shaft portion of the main shaft, the sliding member having an engaging hole and an elliptical hole communicating with each other, the engaging hole non-rotatably receiving the flat- sided shaft portion, the elliptical hole thereof rotatably receiving the engaging portion of the rotating member; and a spring rolled around the main shaft, the spring being positioned and configured for maintaining the engagement between the sliding member and the rotating member.

2. The hinge assembly as claimed in claim 1, wherein the engaging portion of the rotating member is a twisted cylinder.

3. The hinge assembly as claimed in claim 2, wherein the twisted cylinder includes two ellipses and an exterior twisted surface formed between the two ellipses.

4. The hinge assembly as claimed in claim 1, wherein the rotating member further includes a latching portion, the latching portion being connected with the engaging portion of the rotating member.

5. The hinge assembly as claimed in claim 4, wherein at least one protrusion is formed at a peripheral wall of the latching portion.

6. The hinge assembly as claimed in claim 1, wherein the fixing portion of the main shaft is a cuboid.

7. The hinge assembly as claimed in claim 1, wherein the flat-sided shaft portion of the main shaft has two opposite flat surfaces.

8. The hinge assembly as claimed in claim 1, wherein the distal shaft portion has a loop groove defined at one end thereof, the loop groove receiving a locking member therein.

9. The hinge assembly as claimed in claim 1, further comprising a locking member, the locking member is locked at one end of the distal shaft portion of the main shaft.

10. The hinge assembly as claimed in claim 9, wherein the locking member has a C configuration.

11. A foldable electronic device having at least two components hinged together by a hinge assembly, the hinge assembly comprising:

a main shaft having a fixing portion at one end thereof, a flat-sided shaft portion at a central section thereof, and a distal shaft portion at the other end thereof;

a rotating member rotatably engaging with the distal shaft portion of the main shaft, the rotating member including an engaging portion;

a sliding member engaging with the flat-sided shaft portion of the main shaft, the sliding member having an engaging hole and an elliptical hole communicating with each other, the engaging hole non-rotatably receiving the flat-sided shaft portion, the elliptical hole thereof rotatably receiving the engaging portion of the rotating member; and a spring rolled around the main shaft, the spring being positioned and configured for maintaining the engagement between the sliding member and the rotating member.

12. The foldable electronic device as claimed in claim 11, wherein the engaging portion of the rotating member is a twisted cylinder.

13. The foldable electronic device as claimed in claim 12, wherein the twisted cylinder includes two ellipses and an exterior twisted surface formed between the two ellipses.

14. The foldable electronic device as claimed in claim 11, further comprising a locking member, the locking member being locked at one end of the distal shaft portion of the main shaft.

* * * * *